(12) United States Patent
Wang et al.

(10) Patent No.: US 11,518,404 B2
(45) Date of Patent: Dec. 6, 2022

(54) STATIC-STATE CURVATURE ERROR COMPENSATION CONTROL LOGIC FOR AUTONOMOUS DRIVING VEHICLES

(71) Applicant: Baidu USA LLC, Sunnyvale, CA (US)

(72) Inventors: Yu Wang, Sunnyvale, CA (US); Qi Luo, Sunnyvale, CA (US); Jinyun Zhou, Sunnyvale, CA (US); Shu Jiang, Sunnyvale, CA (US); Jiaxuan Xu, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 339 days.

(21) Appl. No.: 16/826,707

(22) Filed: Mar. 23, 2020

(65) Prior Publication Data

US 2021/0291855 A1 Sep. 23, 2021

(51) Int. Cl.
*B60W 60/00* (2020.01)
*B60W 30/18* (2012.01)
*B60W 10/20* (2006.01)
*G05D 1/02* (2020.01)
*B60W 10/04* (2006.01)

(52) U.S. Cl.
CPC .......... *B60W 60/001* (2020.02); *B60W 10/04* (2013.01); *B60W 10/20* (2013.01); *B60W 30/18009* (2013.01); *G05D 1/0212* (2013.01); *B60W 2510/20* (2013.01); *B60W 2520/06* (2013.01); *B60W 2520/10* (2013.01)

(58) Field of Classification Search
CPC ................. B60W 10/04; B60W 10/20; B60W 30/18009; B60W 60/001; G05D 1/0212
See application file for complete search history.

(56) References Cited

U.S. PATENT DOCUMENTS

| | | | | |
|---|---|---|---|---|
| 2008/0097666 | A1* | 4/2008 | Oba | .................... B66F 9/07568 |
| | | | | 701/41 |
| 2019/0315403 | A1* | 10/2019 | Irie | ...................... B62D 15/029 |
| 2020/0307679 | A1* | 10/2020 | Morino | ............... B60W 30/025 |
| 2022/0073094 | A1* | 3/2022 | Ogihara | ................ B60W 10/20 |

* cited by examiner

*Primary Examiner* — Anshul Sood
(74) *Attorney, Agent, or Firm* — Womble Bond Dickinson (US) LLP (57) ABSTRACT

In one embodiment, static-state curvature error compensation control logic for autonomous driving vehicles (ADV) receives planning and control data associated with the ADV, including a planned steering angle and a planned speed. A steering command is generated based on a current steering angle and the planned steering angle of the ADV. A throttle command is generated based on the planned speed in view of a current speed of the ADV. A curvature error is calculated based on a difference between the current steering angle and the planned steering angle. The steering command is issued to the ADV while withholding the throttle command, in response to determining that the curvature error is greater than a predetermined curvature threshold, such that the steering angle of the ADV is adjusted in view of the planned steering angle without acceleration.

20 Claims, 10 Drawing Sheets

STATIC-STATE CURVATURE ERROR COMPENSATION CONTROL LOGIC FOR AUTONOMOUS DRIVING VEHICLES

TECHNICAL FIELD

Embodiments of the present disclosure relate generally to operating autonomous vehicles. More particularly, embodiments of the disclosure relate to curvature error compensation control logic when the autonomous vehicle is in static-state.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

When the vehicle enters the "Start Auto" mode from a static state, it is possible that the planned initial curvature of a planning trajectory provided by the planning module does not match the current actual steering angle (or the planned initial vehicle heading does not match the actual vehicle heading) with a relatively large gap. As a result, the control module forces the vehicle to make a sharp turn during the first several seconds after the vehicle enters "Start Auto" mode so the vehicle follows the planned initial curvature of the planning trajectory.

Two drawbacks can happen when the vehicle is forced by the control module in such situation. First, the vehicle can experience serious vibrations due to the sharp steering and even lose the stability (run out of lane). Second, even if the vehicle can maintain stability, the vehicle can deviate from the initial planned trajectory (due to the initial heading or the curvature error) because the vehicle needs a relatively long time (3-5 seconds or longer) to converge back to the planned trajectory. This curvature deviation may result in a failure of a parking attempt, for example, when the vehicle performs reverse parking to a spot or parallel parking to a narrow spot.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method for operating an autonomous driving vehicle (ADV) is disclosed. Planning and control data associated with the ADV are received. The planning and control data include a planned steering angle and a planned speed. Then, a steering command is generated based on a current steering angle and the planned steering angle of the ADV. A throttle command is then generated based on the planned speed in view of a current speed of the ADV. A curvature error is calculated based on a difference between the current steering angle and the planned steering angle. In response to determining that the curvature error is greater than a predetermined curvature threshold, the steering command is then issued to the ADV while withholding the throttle command, such that the steering angle of the ADV is adjusted in view of the planned steering angle without acceleration.

In one embodiment, it is determined whether the curvature error drops below the predetermined curvature threshold after issuing the steering command. In response to determining that the curvature error is below the predetermined curvature threshold, the throttle command to the ADV is issued. In one embodiment, a heading error is determined based on a difference between a current heading of the ADV and a planned heading obtained from the planning and control data. The steering command is modified based on the heading error to compensate the heading error, while withholding the throttle command.

In one embodiment, the heading error is determined whether is greater than a predetermined heading threshold. Then, the steering command is modified in response to determining that the heading error is greater than the predetermined heading threshold. The steering command is modified based on the heading error and the current speed of the ADV. In one embodiment, the curvature error is detected when the current steering angle associated with at least front wheels of the ADV does not significantly match the planned steering angle. The predetermined curvature threshold is determined based on the current speed of the ADV. In embodiment, it is determined whether the current speed of the ADV is below a predetermined speed threshold. The steering command is issued without issuing the throttle command if the current speed of the ADV is below the predetermined speed threshold.

In another aspect of the disclosure, embodiments of the present disclosure also provide a non-transitory machine-readable medium and a data processing system perform the processes as described above.

Figure 1:
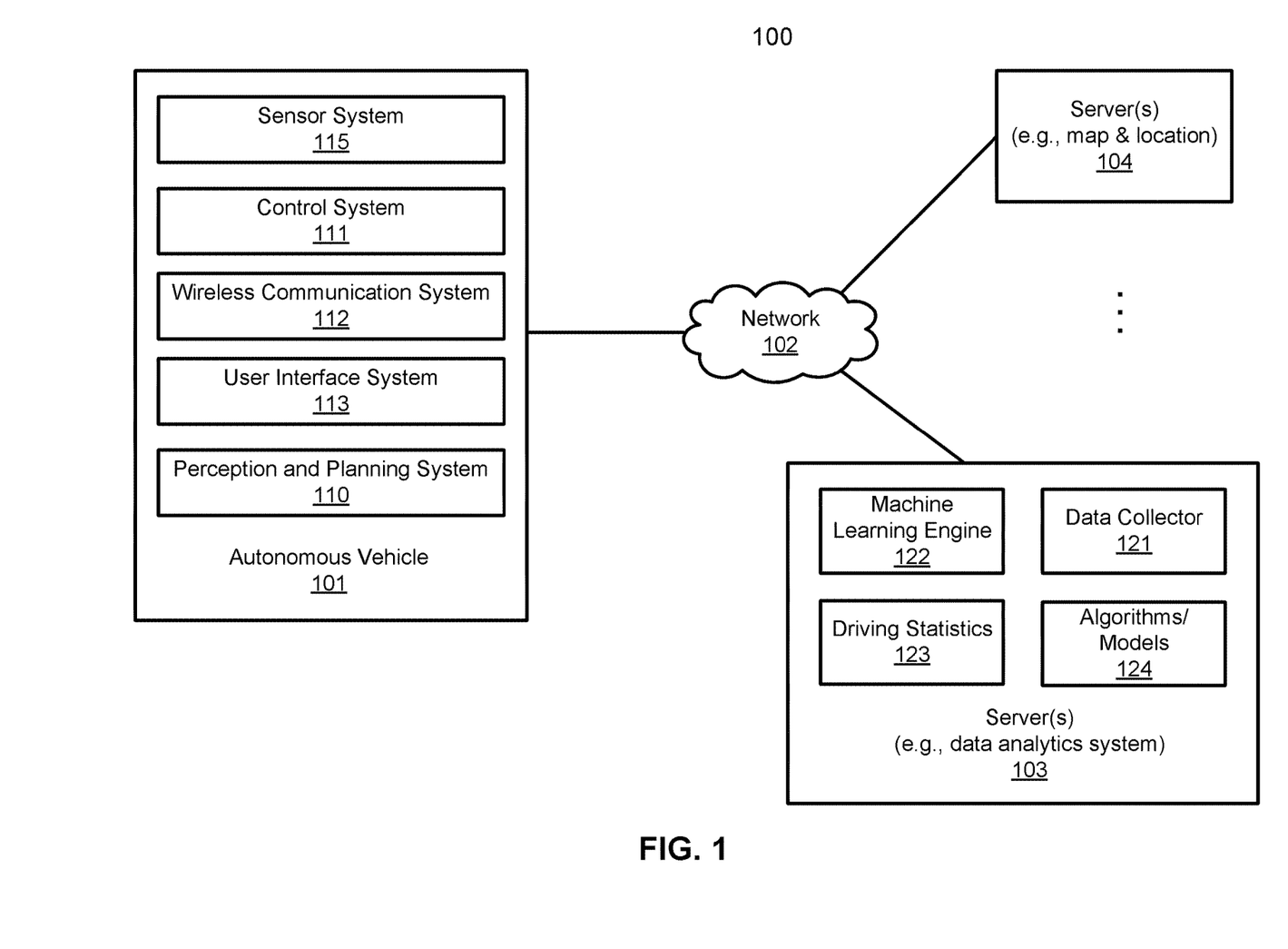
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
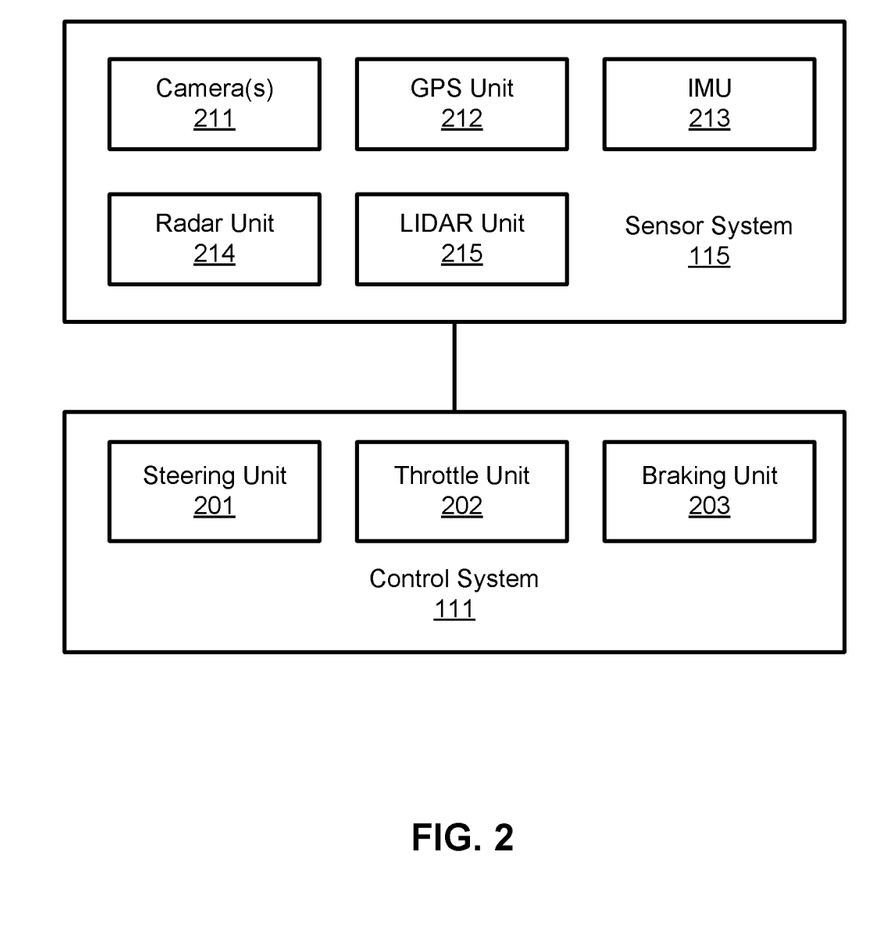
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to calculate the steering or curvature errors when a vehicle is in a static mode (e.g., not a moving state) and compensate for the same. Algorithms 124 can then be uploaded on ADVs to be utilized during autonomous driving in real-time.

Figure 3A:
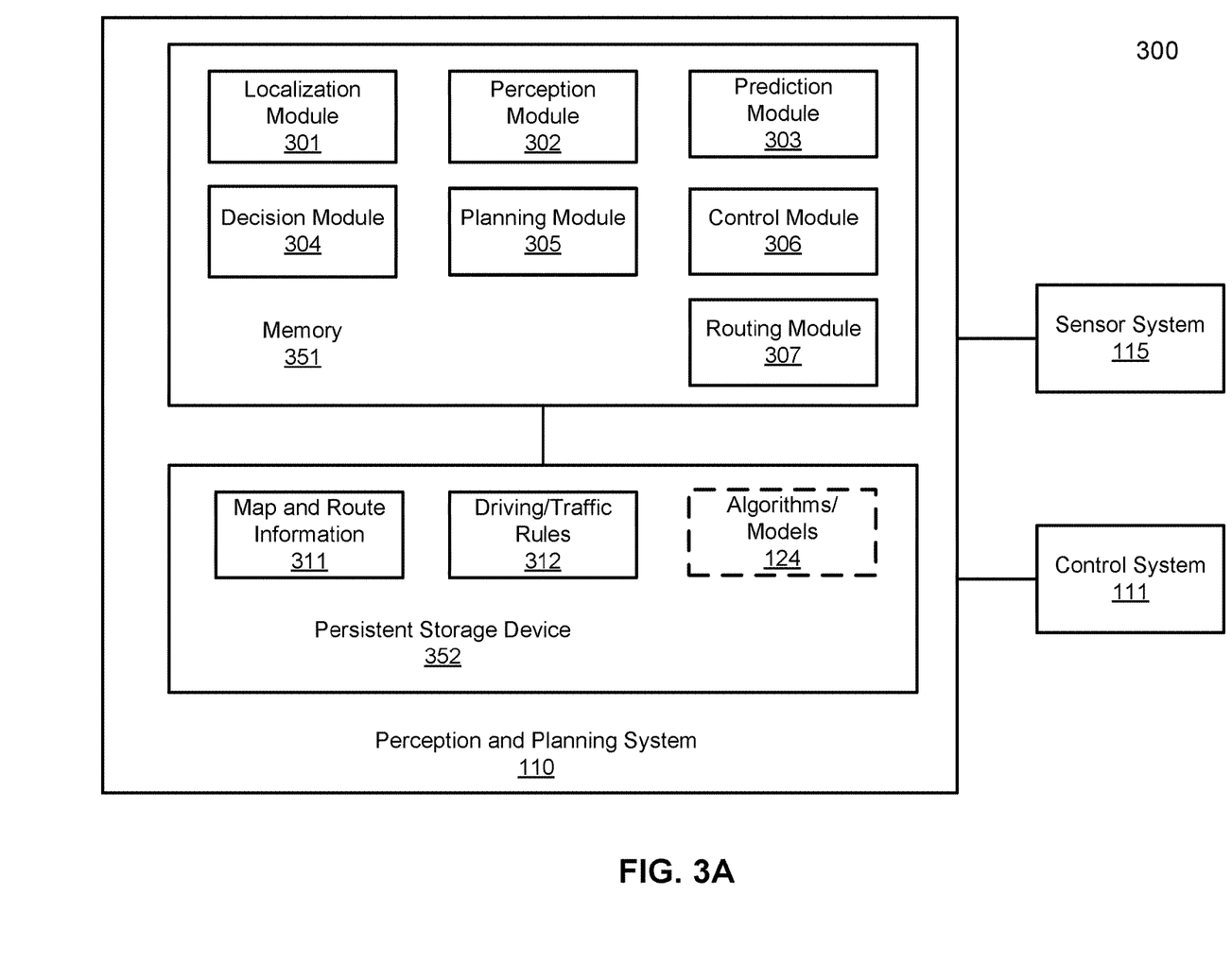
FIGS. 3A-3B are block diagrams illustrating an example of a perception and planning system used with an autonomous vehicle according to one embodiment.
Figure 3B:
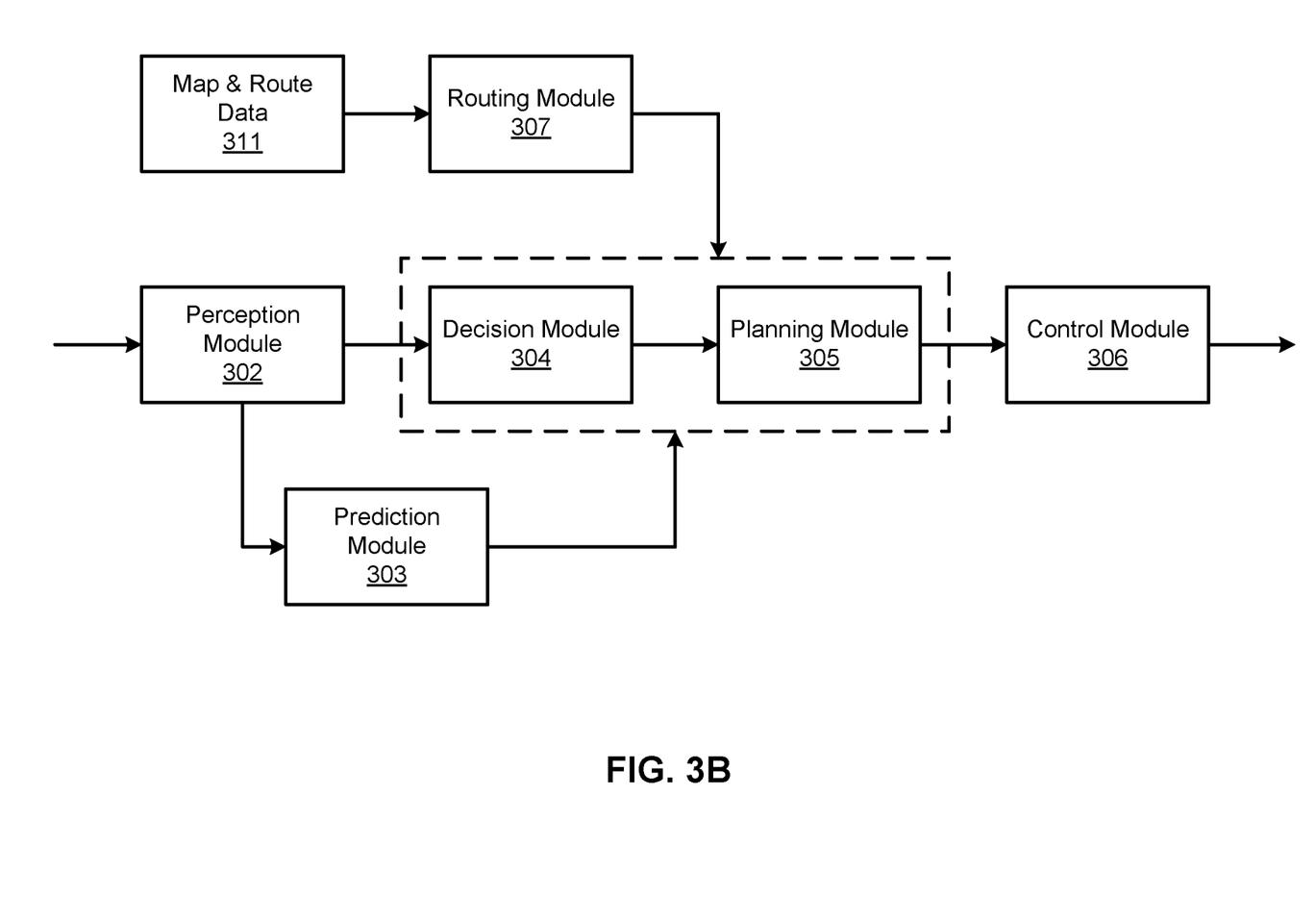

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4A:
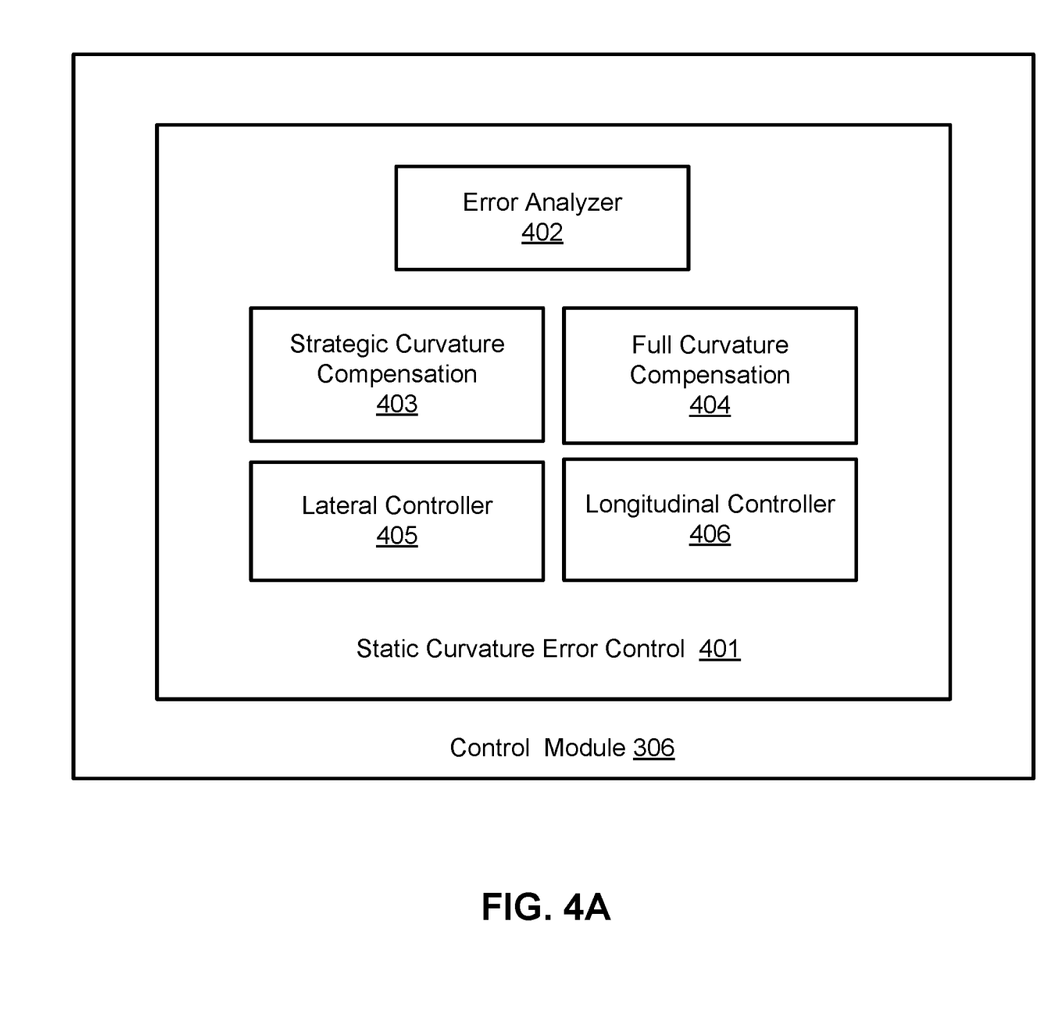
FIG. 4A is a block diagram illustrating an example of a control module used with an autonomous vehicle according to one embodiment.

FIG. 4A is a block diagram illustrating an example of a control module 306 used with an autonomous vehicle according to one embodiment. According to one embodiment, static curvature error control module 401 includes error analyzer 402, strategic curvature compensation 403, full curvature compensation 404, lateral controller 405, and longitudinal controller 406.

In one embodiment, error analyzer 402 is configured to perform error analysis 409 including calculating a curvature error based on a difference between the received current steering angle and the planned steering angle. In another embodiment, error analyzer 402 is configured to perform error analysis 409 including determining a heading error based on a difference between a current heading of the ADV and a planned heading obtained from the planning and control data.

In one embodiment, the strategic curvature compensation module 403 is initiated when there is heading error (i.e., there is a difference between the ADV current heading and the planned heading). The strategic curvature compensation module 403 calculates an appropriate curvature target for the lateral control while the ADV at static state. The steering command is modified based on the heading error to compensate the heading error, while withholding the throttle command.

In one embodiment, the full curvature compensation module 404 is initiated if there is only curvature error (i.e., the ADV current heading matches the vehicle planned heading, but the current steering angle associated with the front wheel of the ADV does not match the planned steering angle). The full curvature compensation module 404 allows the steering angle of the ADV to be adjusted in view of the planned steering angle without acceleration. In such manner, the ADV 501 is steered according to the planned steering angle.

In one embodiment, the lateral controller 405 generates a steering command based on a current steering angle and the planned steering angle of the ADV. The lateral controller 405 also issues the steering command to the ADV while withholding the throttle command, in response to determining that the curvature error is greater than a predetermined curvature threshold, such that the steering angle of the ADV is adjusted in view of the planned steering angle without acceleration.

In one embodiment, the longitudinal controller 406 generates a throttle command based on the planned speed in view of a current speed of the ADV. The longitudinal controller 406 sends a command to the control module 306 to temporarily neglects the longitudinal planned trajectory.

Figure 4B:
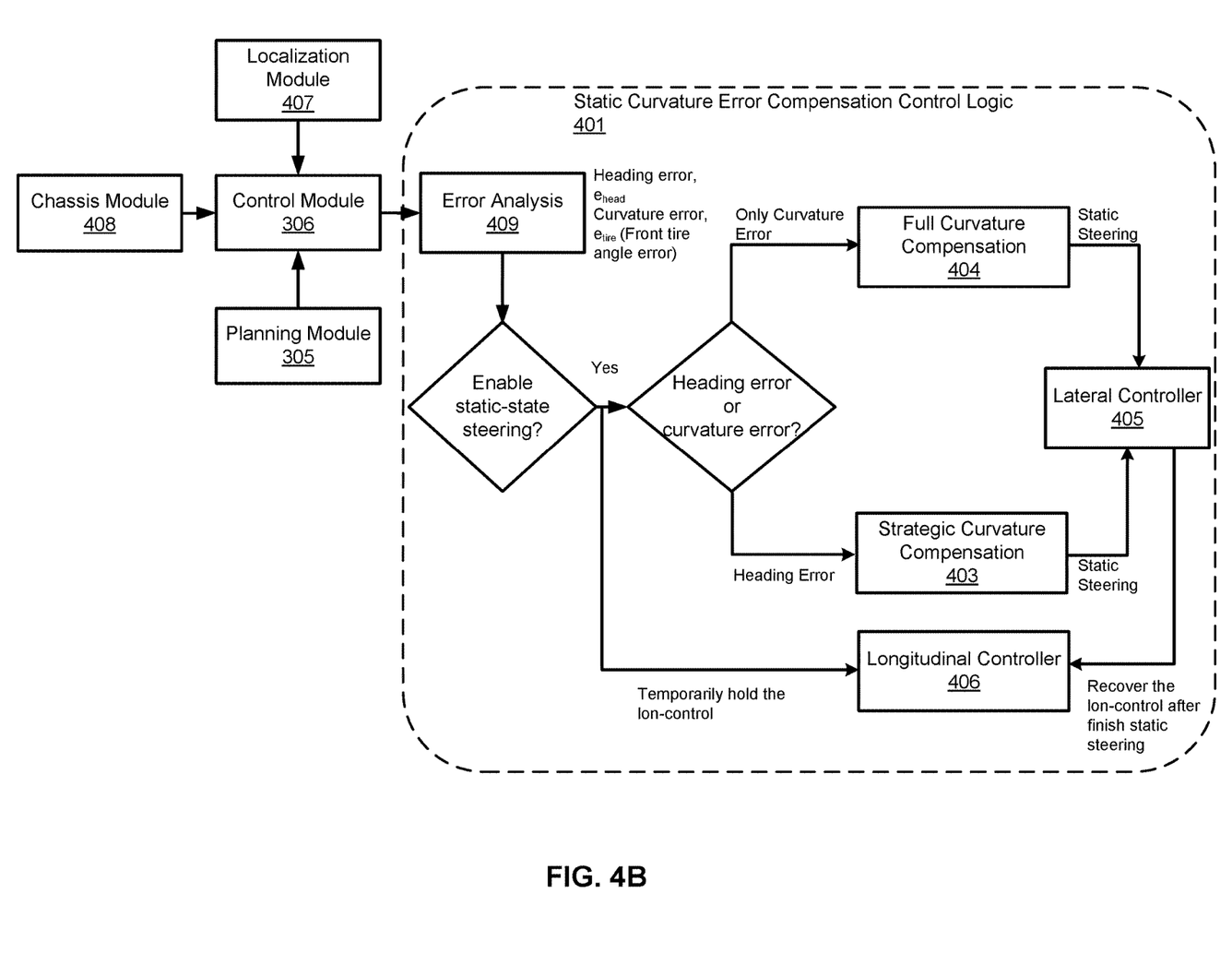
FIG. 4B is a processing flow diagram illustrating a processing flow of static-state curvature error compensation control of an autonomous driving vehicle according to one embodiment of the invention.

FIG. 4B is a processing flow diagram illustrating a processing flow of static-state curvature error compensation control of an autonomous driving vehicle according to one embodiment of the invention. According to one embodiment, static curvature error control module 401 is configured to allow the current steering angle of the ADV to be adjusted to match the planned steering angle while the ADV is in static state. Similarly, the static curvature error control module 401 is configured to allow the current heading angle of the ADV to be adjusted to match the planned heading while the ADV is in static state. In this manner, the ADV does not deviate from the initial planned trajectory when making a turn according to a planned curvature. Curvature deviation may result in a failure of a parking attempt, for example, when the vehicle performs reverse parking to a spot or parallel parking to a narrow spot.

In one embodiment, the static curvature error control module 401 receives planning and control data associated with the ADV from the control module 306 and the planning module 305, including a planned steering angle and a planned speed. The lateral controller 405 generates a steering command based on a current steering angle and the planned steering angle of the ADV. Longitudinal controller 406 generates a throttle command based on the planned speed in view of a current speed of the ADV.

In some embodiments, error analyzer 402 is configured to perform error analysis 409 including calculating a curvature error based on a difference between the received current steering angle and the planned steering angle.

The static curvature error control module 401 determines whether the ADV is in static state based on the current speed of the ADV. The current speed of the ADV is obtained from the localization module 407.

The static curvature error control module 401 determines whether the curvature error is greater than a predetermined curvature threshold. The predetermined curvature threshold is determined based on the current speed of the ADV. If the static curvature error control module 401 determines that the ADV is in the static state and the curvature error is greater than a predetermined curvature threshold, static-state steering is enabled.

In one embodiment, error analyzer 402 is also configured to perform error analysis 409 including determining a heading error based on a difference between a current heading of the ADV and a planned heading obtained from the planning and control data. The steering command is modified based on the heading error to compensate the heading error, while withholding the throttle command.

When the static-state steering is enabled, the longitudinal controller 406 is configured to temporarily holds the longitudinal control (throttle control) of the ADV. The longitudinal controller 406 sends a command to the control module 306 to temporarily neglects the longitudinal planned trajectory. The longitudinal planned trajectory includes the station and speed of the ADV. The static curvature error control module 401 determines the type of error (curvature error or heading error) that has been detected by the error analyzer 402. If only a curvature error is detected, full curvature compensation 404 is enabled.

In one embodiment, the curvature error is detected when the current steering angle associated with at least front wheels 502 of the ADV 501 does not significantly match the planned steering angle. The curvature error is based on a difference between the current steering angle and the planned steering angle.

The lateral controller 405 generates a steering command based on a current steering angle and the planned steering angle of the ADV. The lateral controller 405 issues the steering command to the ADV while longitudinal controller 406 withholds the throttle command, in response to determining that the curvature error is greater than a predetermined curvature threshold, such that the steering angle of the ADV is adjusted in view of the planned steering angle without acceleration.

Static curvature error control module 401 determines whether the curvature error drops below the predetermined curvature threshold after the lateral controller 405 issues the steering command. Longitudinal controller 406 generates a throttle command based on the planned speed in view of a current speed of the ADV. The longitudinal controller 406 issues the throttle command to the ADV in response to determining that the curvature error is below the predetermined curvature threshold.

In another embodiment, if a heading error is detected, strategic curvature compensation 403 is initiated. The lateral controller 405 issues the steering command to the ADV while longitudinal controller 406 withholding the throttle command. The steering angle of the ADV is adjusted in view of the planned steering angle without acceleration. After lateral controller 405 adjusts the steering angle of the ADV, longitudinal controller 406 recovers the longitudinal control of the ADV.

In one embodiment, error analyzer 402 determines whether the heading error is greater than a predetermined heading threshold, wherein the steering command is modified in response to determining that the heading error is greater than the predetermined heading threshold. Static curvature error control module 401 modifies the steering command based on the heading error and the current speed of the ADV.

In one embodiment, error analyzer 402 detects curvature error when the current steering angle associated with at least front wheels of the ADV does not significantly match the planned steering angle. Static curvature error control module 401 determines the predetermined curvature threshold based on the current speed of the ADV.

Static curvature error control module 401 determines whether the current speed of the ADV is below a predetermined speed threshold, wherein the steering command is issued without issuing the throttle command if the current speed of the ADV is below the predetermined speed threshold.

Figure 5:
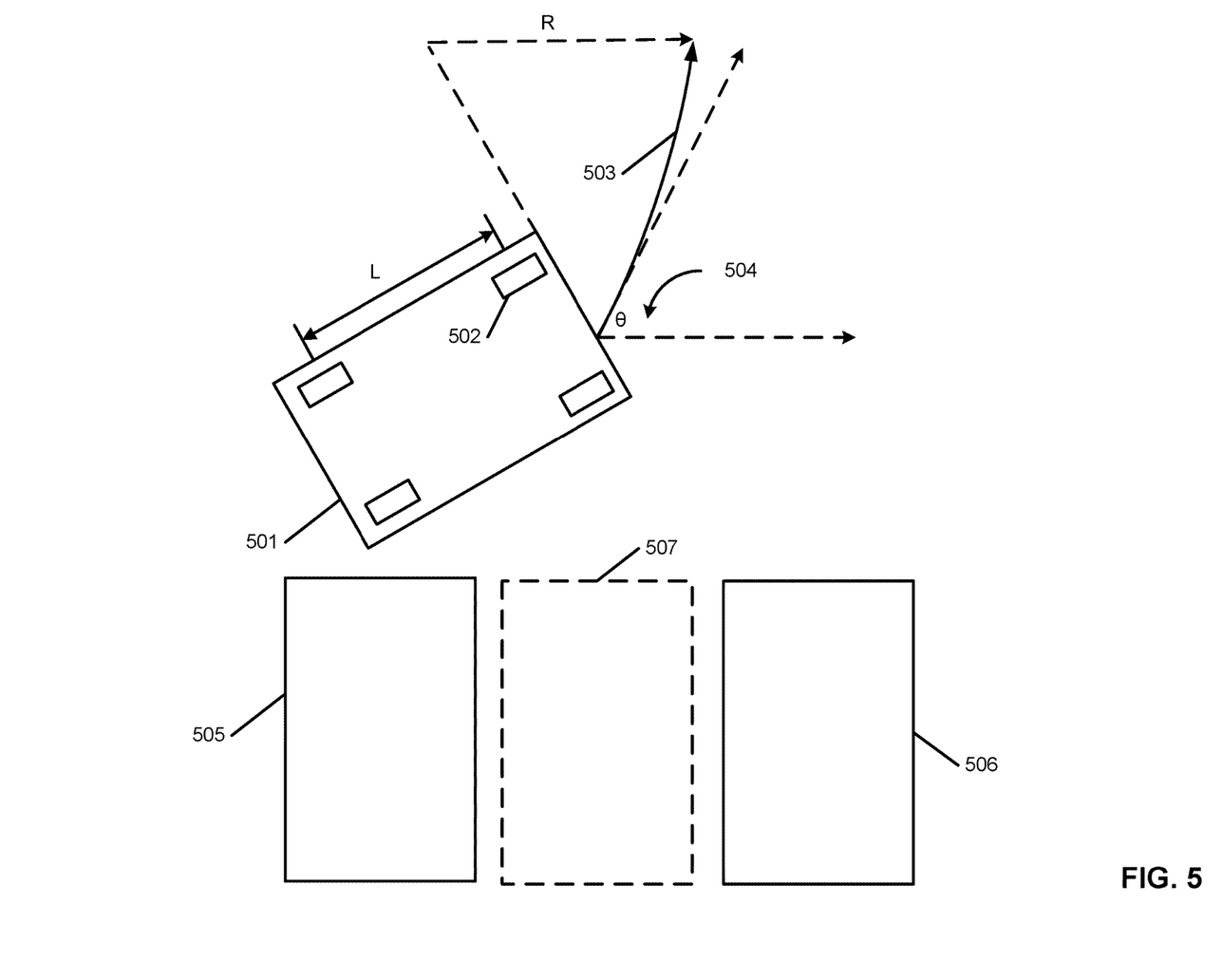
FIG. 5 is a diagram illustrating a typical scenario when a vehicle in a static state making a turn according to certain embodiments of the invention.

FIG. 5 is a diagram illustrating a scenario when an ADV 501 in a static state before making a turn according to a curvature 503.

In one embodiment, the curvature 503 C may be determined based on the following formula:

$$C = \frac{1}{R}$$

where R is a turning radius associated with the curvature 503.

Referring to FIG. 5, the ADV 501 is performing a reverse parking to an empty space 507 between a vehicle 505 and a vehicle 506. This scenario represents a short-time scenario with a substantial pose-adjustment. In this scenario, the current steering angle 504 associated with at least front wheels of the ADV 502 matches the planned steering angle. Similarly, the current heading of the ADV 502 matches the planned heading of the ADV. The planned initial curvature matches the current actual steering angle and the planned initial heading matches the current vehicle heading. As a result, there is no heading or curvature error detected in this scenario. Static-state steering is not enabled and the control module 306 sends a command (steering command and throttle command) the ADV 501 to follow the planned trajectory obtained from the planning module. In this manner, the steering angle or the steering command needs not to be adjusted for the ADV to successfully perform a reverse parking to an empty space 507.

In one embodiment, the steering angle, θ 504 may be determined based on the following formula:

$$\tan(\theta) = \frac{1}{R} * L$$

where R is a turning radius associated with the curvature 503 and L is the wheelbase (the distance between the front axle and rear axle) associated with the ADV.

Figure 6A:
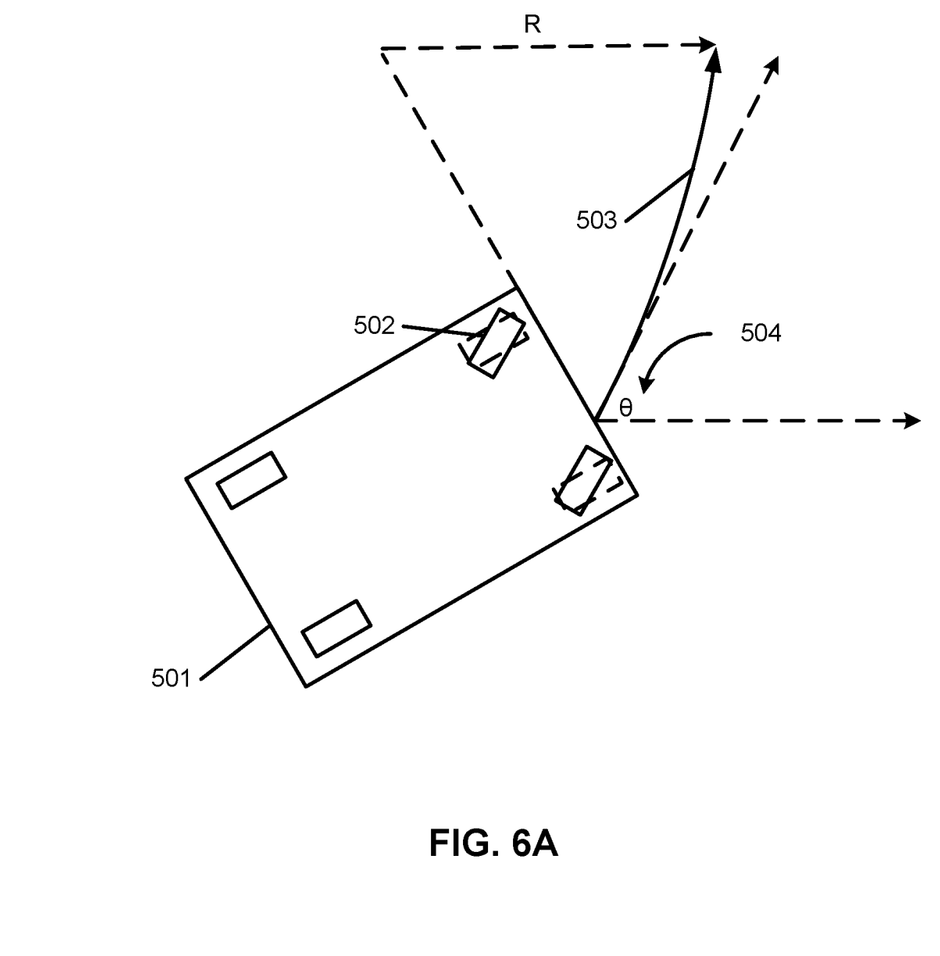
FIG. 6A is a diagram illustrating a typical scenario when a vehicle in a static state having a steering error according to certain embodiments of the invention.

FIG. 6A is a diagram illustrating a typical scenario when an ADV in a static state having a steering error before making a turn according to a curvature 503 according to certain embodiments of the invention. Referring to FIG. 6A, when the current steering angle, θ 504 associated with at least front wheels of the ADV does not significantly match the planned steering angle when the ADV is in static state, the error analyzer detects a curvature error. In this scenario, the current steering angle 504 associated with at least front wheels of the ADV does not significantly match the planned steering angle. The current steering angle 504 associated with at least front wheels of the ADV is obtained from the vehicle chassis module 408. The current speed and the heading angle of the ADV are obtained from the localization module 407. The planned trajectory including the planned station, the heading angle, and the curvature are obtained from planning module 305.

The static curvature error control module 401 determines whether the current ADV is in static state based on the current speed of the ADV. The error analyzer 402 calculates a curvature error based on a difference between the current steering angle 504 and the planned steering angle.

If it is determined that the ADV 501 is in static state and the curvature error is higher than the predetermined curvature threshold, static-state steering is enabled. The longitudinal controller 406 is enabled so the longitudinal control (throttle control) is temporarily suspended so the control module steers the ADV until the ADV matches the initial planned curvature without acceleration. The static-state steering control is initialized in the lateral control.

In the lateral control, if there is only curvature error (i.e., the vehicle current heading matches the vehicle planned heading, but the initial steering/front wheel angle does not match the planned steering angle), the full curvature compensation module 404 is initiated to steer the ADV 501 according to the planned steering angle.

The steering command is issued to the ADV 501 while withholding the throttle command, in response to determining that the curvature error is greater than a predetermined curvature threshold, such that the steering angle of the ADV is adjusted in view of the planned steering angle without acceleration.

The static curvature error control determines whether the curvature error drops below the predetermined curvature threshold after issuing the steering command. The throttle command is issued to the ADV in response to determining that the curvature error is below the predetermined curvature threshold.

The static curvature error compensation control enables static-state steering upon detecting the curvature error. A command is transmitted to the longitudinal controller 406 to temporarily holds the longitudinal control. If only curvature error is detected, a full curvature compensation module 404 is initiated to enable the static steering.

Figure 6B:
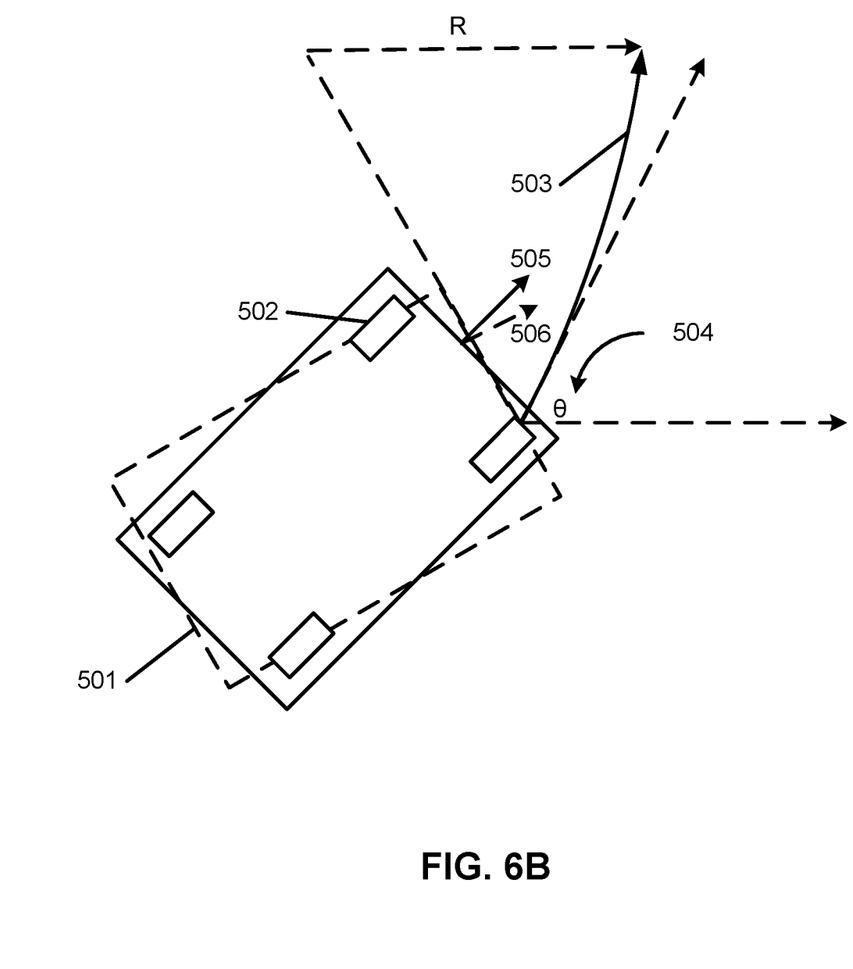
FIG. 6B is a diagram illustrating a typical scenario when a vehicle in a static state having a heading error according to certain embodiments of the invention.

FIG. 6B is a diagram illustrating a typical scenario when an ADV 501 in a static state having a heading error before making a turn according to a curvature 503 according to certain embodiments of the invention. Referring to FIG. 6B, when the current heading 505 of the ADV 501 does not match with the planned heading 506 of the ADV when the ADV is in static state, the error analyzer 402 detects a heading error. The current speed and heading angle of the ADV are obtained from the localization module 407. The planned trajectory including the planned station, the heading angle, and the curvature are obtained from planning module 305.

The static curvature error control module 401 determines whether the current ADV 501 is in static state based on the current speed of the ADV 501. The error analyzer 402 determines a heading error based on a difference between a current heading 505 of the ADV and a planned heading 506 obtained from the planning and control data. The steering command is modified based on the heading error to compensate the heading error, while withholding the throttle command. If it is determined that the ADV 501 is in static state and the heading error is greater than a predetermined heading threshold, static-state steering is enabled. The steering command is modified in response to determining that the heading error is greater than the predetermined heading threshold.

The longitudinal controller 406 is enabled so the longitudinal control (throttle control) is temporarily suspended so the control module 306 steers the ADV until the ADV matches the initial planned curvature without acceleration. The static-state steering control is initialized in the lateral control. In the lateral control, if there is heading error (i.e., there is large gap between the current vehicle heading and the planned heading), the strategic curvature compensation module 403 is initiated. The strategic curvature compensation module 403 calculates an appropriate curvature target for the lateral control at static-state.

The steering command is issued to the ADV while withholding the throttle command, in response to determining that the heading error is greater than a predetermined heading threshold, such that the steering angle of the ADV is adjusted in view of the planned steering angle without acceleration. The steering command is modified based on the heading error and the current speed of the ADV.

The static curvature error control 401 determines whether the curvature error drops below the predetermined curvature threshold after issuing the steering command. The throttle command is issued to the ADV in response to determining that the curvature error is below the predetermined curvature threshold. The static curvature error compensation control 401 enables static-state steering upon detecting the curvature error. A command is transmitted to the longitudinal controller 406 to temporarily holds the longitudinal control. When only curvature error is detected, a full curvature compensation 404 is initiated to enable the static steering.

Figure 7:
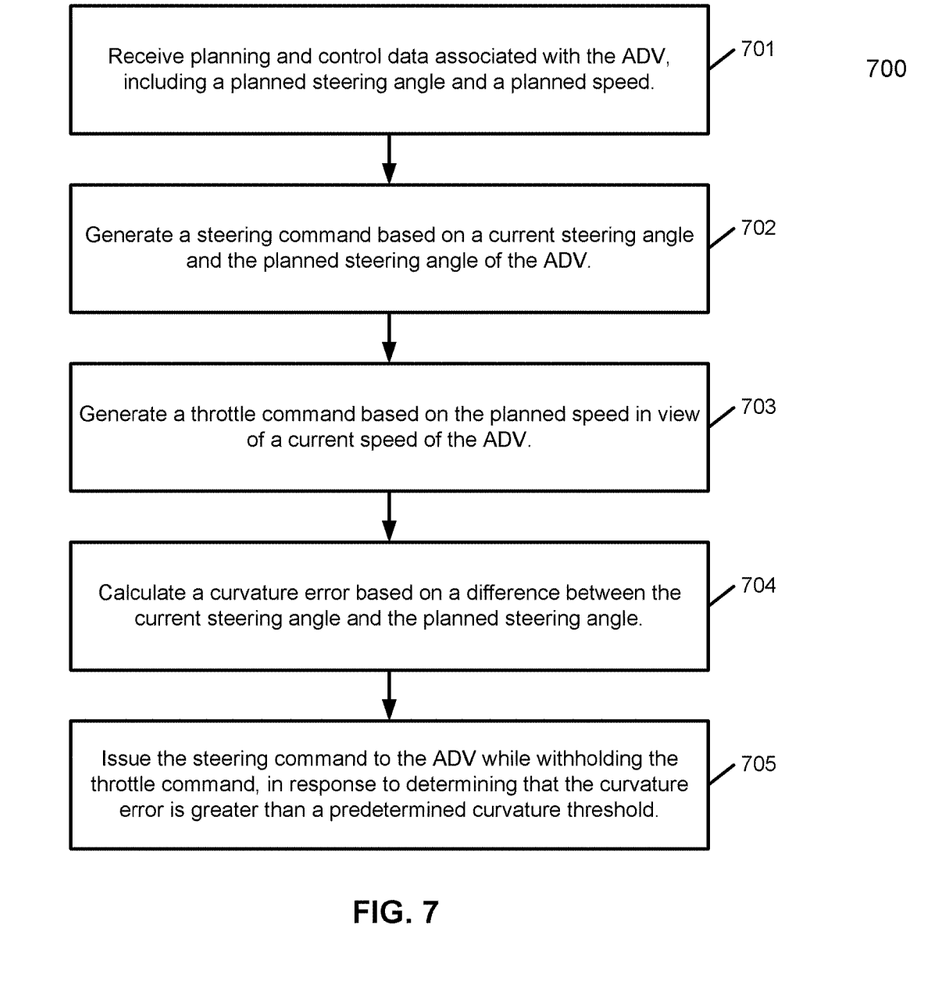
FIG. 7 is a flow diagram illustrating a process of operating an autonomous driving vehicle according to one embodiment of the invention.

FIG. 7 is a flow diagram illustrating a process of operating an autonomous driving vehicle according to one embodiment of the invention. Process 700 may be performed by processing logic which may include software, hardware, or a combination thereof. For example, process 700 may be performed by static curvature error control 401 of FIG. 4A. Referring to FIG. 7, in operation 701, processing logic receives planning and control data associated with the ADV, including a planned steering angle and a planned speed. In operation 702, processing logic generates a steering command based on a current steering angle and the planned steering angle of the ADV.

In operation 703, processing logic generates a throttle command based on the planned speed in view of a current speed of the ADV. In operation 704, processing logic calculates a curvature error based on a difference between the current steering angle and the planned steering angle.

In operation 705, processing logic issues the steering command to the ADV while withholding the throttle command, in response to determining that the curvature error is greater than a predetermined curvature threshold, such that the steering angle of the ADV is adjusted in view of the planned steering angle without acceleration.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   receiving planning and control data associated with the ADV, including a planned steering angle and a planned speed;
   generating a steering command based on a current steering angle and the planned steering angle of the ADV;
   generating a throttle command based on the planned speed in view of a current speed of the ADV;
   calculating a curvature error based on a difference between the current steering angle and the planned steering angle; and
   issuing the steering command to the ADV while withholding the throttle command, in response to determining that the curvature error is greater than a predetermined curvature threshold, such that the current steering angle of the ADV is adjusted in view of the planned steering angle without acceleration.

2. The method of claim 1, further comprising:
   determining whether the curvature error drops below the predetermined curvature threshold after issuing the steering command; and issuing the throttle command to the ADV in response to determining that the curvature error is below the predetermined curvature threshold.

3. The method of claim 1, further comprising:
determining a heading error based on a difference between a current heading of the ADV and a planned heading obtained from the planning and control data; and
modifying the steering command based on the heading error to compensate the heading error, while withholding the throttle command.

4. The method of claim 3, further comprising determining whether the heading error is greater than a predetermined heading threshold, wherein the steering command is modified in response to determining that the heading error is greater than the predetermined heading threshold.

5. The method of claim 3, wherein the steering command is modified based on the heading error and the current speed of the ADV.

6. The method of claim 1, wherein the curvature error is detected when the current steering angle associated with at least front wheels of the ADV does not match the planned steering angle.

7. The method of claim 1, wherein the predetermined curvature threshold is determined based on the current speed of the ADV.

8. The method of claim 1, further comprising determining whether the current speed of the ADV is below a predetermined speed threshold, wherein the steering command is issued while withholding the throttle command in response both to determining that the curvature error is greater than the predetermined curvature threshold and to determining that the current speed of the ADV is below the predetermined speed threshold.

9. A non-transitory machine-readable medium having instructions stored therein, which when executed by a processor, cause the processor to perform operations, the operations comprising:
receiving planning and control data associated with an autonomous driving vehicle ADV, including a planned steering angle and a planned speed;
generating a steering command based on a current steering angle and the planned steering angle of the ADV;
generating a throttle command based on the planned speed in view of a current speed of the ADV;
calculating a curvature error based on a difference between the current steering angle and the planned steering angle; and
issuing the steering command to the ADV while withholding the throttle command, in response to determining that the curvature error is greater than a predetermined curvature threshold, such that the current steering angle of the ADV is adjusted in view of the planned steering angle without acceleration.

10. The machine-readable medium of claim 9, wherein the operations further comprise:
determining whether the curvature error drops below the predetermined curvature threshold after issuing the steering command; and
issuing the throttle command to the ADV in response to determining that the curvature error is below the predetermined curvature threshold.

11. The machine-readable medium of claim 9, wherein the operations further comprise:

determining a heading error based on a difference between a current heading of the ADV and a planned heading obtained from the planning and control data; and
modifying the steering command based on the heading error to compensate the heading error, while withholding the throttle command.

12. The machine-readable medium of claim 11, wherein the operations further comprise determining whether the heading error is greater than a predetermined heading threshold, wherein the steering command is modified in response to determining that the heading error is greater than the predetermined heading threshold.

13. The machine-readable medium of claim 11, wherein the steering command is modified based on the heading error and the current speed of the ADV.

14. The machine-readable medium of claim 9, wherein the curvature error is detected when the current steering angle associated with at least front wheels of the ADV does not match the planned steering angle.

15. The machine-readable medium of claim 9, wherein the predetermined curvature threshold is determined based on the current speed of the ADV.

16. The machine-readable medium of claim 9, wherein the operations further comprise determining whether the current speed of the ADV is below a predetermined speed threshold, wherein the steering command is issued while withholding issuing the throttle command in response both to determining that the curvature error is greater than the predetermined curvature threshold and to determining that the current speed of the ADV is below the predetermined speed threshold.

17. A data processing system, comprising:
a processor; and
a memory coupled to the processor to store instructions, which when executed by the processor, cause the processor to perform operations, the operations including;
receiving planning and control data associated with an autonomous driving vehicle ADV, including a planned steering angle and a planned speed;
generating a steering command based on a current steering angle and the planned steering angle of the ADV;
generating a throttle command based on the planned speed in view of a current speed of the ADV;
calculating a curvature error based on a difference between the current steering angle and the planned steering angle; and
issuing the steering command to the ADV while withholding the throttle command, in response to determining that the curvature error is greater than a predetermined curvature threshold, such that the current steering angle of the ADV is adjusted in view of the planned steering angle without acceleration.

18. The system of claim 17, wherein the operations further comprise:
determining whether the curvature error drops below the predetermined curvature threshold after issuing the steering command; and
issuing the throttle command to the ADV in response to determining that the curvature error is below the predetermined curvature threshold.

19. The system of claim 17, wherein the operations further comprise:

determining a heading error based on a difference between a current heading of the ADV and a planned heading obtained from the planning and control data; and modifying the steering command based on the heading error to compensate the heading error, while withholding the throttle command.

20. The system of claim 19, wherein the operations further comprise determining whether the heading error is greater than a predetermined heading threshold, wherein the steering command is modified in response to determining that the heading error is greater than the predetermined heading threshold.

\* \* \* \* \*